United States Patent
Oka

(10) Patent No.: US 6,488,262 B1
(45) Date of Patent: Dec. 3, 2002

(54) GATE VALVE FOR SEMICONDUCTOR PROCESSING SYSTEM

(75) Inventor: Hiroki Oka, Kofu (JP)

(73) Assignee: Tokyo Electron Limited, Tokyo (JP)

( * ) Notice: Subject to any disclaimer, the term of this patent is extended or adjusted under 35 U.S.C. 154(b) by 0 days.

(21) Appl. No.: 09/926,379

(22) PCT Filed: May 30, 2000

(86) PCT No.: PCT/JP00/03466

§ 371 (c)(1),
(2), (4) Date: Oct. 23, 2001

(87) PCT Pub. No.: WO00/75542

PCT Pub. Date: Dec. 14, 2000

(30) Foreign Application Priority Data

Jun. 2, 1999 (JP) .......................................... 11-155538

(51) Int. Cl.⁷ ................................................ F16K 3/18
(52) U.S. Cl. ...................................... 251/193; 251/279
(58) Field of Search .............................. 251/193, 279, 251/326, 197, 198, 199, 200, 201, 202

(56) References Cited

U.S. PATENT DOCUMENTS

| 1,707,125 A | * | 3/1929 | Löffler | 251/193 |
| 2,841,361 A | * | 7/1958 | Palmer | 251/198 |
| 3,352,535 A | * | 11/1967 | Power | 251/280 |
| 5,120,019 A | * | 6/1992 | Davis, Jr. | 251/193 |
| 5,150,882 A | * | 9/1992 | Kaneko | 251/193 |
| 5,275,303 A | | 1/1994 | Szalai | |
| 5,415,375 A | * | 5/1995 | Gaboriault | 251/193 |
| 5,755,426 A | * | 5/1998 | Boesch | 251/193 |
| 5,769,952 A | * | 6/1998 | Komino | 251/193 |

FOREIGN PATENT DOCUMENTS

| JP | 1-17024 | 3/1989 |
| JP | 5-196450 | 8/1993 |
| JP | 9-310766 | 12/1997 |
| JP | 10-159999 | 6/1998 |
| JP | 10-227365 | 8/1998 |

* cited by examiner

*Primary Examiner*—Henry C. Yuen
*Assistant Examiner*—John Bastianelli
(74) *Attorney, Agent, or Firm*—Oblon, Spivak, McClelland, Maier & Neustadt, P.C.

(57) ABSTRACT

A gate valve (20) for a semiconductor processing system includes a base frame (28) configured movable along a guide (26) to move toward and away from a valve seat (22), which surrounds an opening portion (14). A first stopper (56) is disposed at the upper end of the guide (26), for defining the movement limit of the base frame (28) on the valve seat (22) side. A swing frame (34) is rotatably attached to the base frame (28), and has an upper end connected to a valve plug (24). The swing frame (34) is connected to the base frame (28) by a link mechanism (36), which can bend and stretch while flexing an intermediate portion, and by a spring and damper member (46). The intermediate portion of the link mechanism (36) has a mediation member (38) connected to a reciprocation rod (54) of an air actuator (52).

16 Claims, 15 Drawing Sheets

GATE VALVE FOR SEMICONDUCTOR PROCESSING SYSTEM

TECHNICAL FIELD

The present invention relates to a gate valve used on, e.g., a load lock chamber or a process chamber in a semiconductor processing system for subjecting a target substrate, such as a semiconductor wafer, to a process. The term "semiconductor process" used herein includes various kinds of processes which are performed to manufacture a semiconductor device or a structure having wiring layers, electrodes, and the like to be connected to a semiconductor device, on a target substrate, such as a semiconductor wafer or an LCD substrate, by forming semiconductor layers, insulating layers, and conductive layers in predetermined patterns on the target substrate.

BACKGROUND ART

Conventionally, a structure utilizing a link mechanism or a cam mechanism is known as a driving mechanism for a gate valve. For example, Jpn. Pat. Appln. KOKAI Publication No. 5-196450 discloses a gate valve employing a link mechanism, as shown in FIG. 10. Jpn. Pat. Appln. KOKAI Publication No. 10-159999 discloses a gate valve employing a cam mechanism, as shown in FIGS. 11A and 11B.

The gate valve 100 shown in FIG. 10 is disposed between a load lock chamber 110 and a process chamber 120. The gate valve 100 includes a base body 102 and a valve plug 105 disposed in a gate casing 106. The base body 102 is connected to an actuator 101. A guide rail 107 is disposed on the wall of the gate casing 106 on the load lock chamber 110 side, so that the base body 102 is guided to move up and down. The valve plug 105 is connected to the base body 102 by links 103 and 104 at upper and lower positions. The valve plug 105 is further connected to the base body 102 by a spring 108. The valve plug 105 opens and closes an opening portion 121 of a process chamber 120.

When the opening portion 121 of the process chamber 120 is closed, the actuator 101 is activated to integratedly move up the base body 102 and the valve plug 105 along the guide rail 107. Even after a roller 109 disposed at the top of the valve plug 105 comes into contact with the ceiling of the gate casing 106, the base body 102 keeps moving up. Consequently, the valve plug 105 cannot move up any more, but moves toward the opening portion 121 of the process chamber 120 against the action of the spring 108 while rotating the roller 109. When the base body 102 reaches the upper end, the height of the base body 102 is leveled with that of the valve plug 105. At this time, the valve plug 105 is strongly pushed against the opening portion 121 of the process chamber 120 by the links 103 and 104, so that the opening portion 121 is closed.

When the opening portion 121 is opened, the actuator 101 is activated in the opposite direction to move down the base body 102. Consequently, the valve plug 105 is pulled by the spring 108 toward the base body 102, so that the opening portion 121 is opened. Then, the base body 102 moves down further, and the valve plug 105 returns to the initial state by the action of the spring 108.

The gate valve 100 shown in FIG. 10, i.e., disclosed in Jpn. Pat. Appln. KOKAI Publication No. 5-196450, employs members, such as the guide rail 107 and the spring 108, other than the link mechanism, at positions near the valve plug 105, to realize a sliding movement of the base body 102 and the valve plug 105, and their movement to/from the opening portion. As a result, this structure entails a problem in that the roller 109 comes into contact with the inner wall of the gate casing 106, thereby most likely generating particles.

On the other hand, the gate valve 200 shown in FIGS. 11A and 11B includes a valve plug 201 for opening and closing an opening portion 210. A pair of right and left side plates 202 are fixed to the valve plug 201 at each of the upper and lower levels. Each of the side plates 202 is provide with a first guide groove 203 formed therein and having a unique shape.

The gate valve 200 also includes valve plug driving rods 205, which are provided with second guide grooves 204 formed therein and each having a unique shape corresponding to the first guide groove 203. The valve plug driving rods 205 are connected to the valve plug 201 by shaft rollers 206 each inserted in the first and second guide grooves 203 and 204. The valve driving rods 205 are further connected to the side plates 202 by springs 207.

FIG. 11B is an enlarged view showing the relationship between the first and second guide grooves 203 and 204, and the roller 206. As shown in FIG. 11B, when the opening portion 210 is in an open state, the guide grooves 203 and 204 are displaced from each other, viewed from a lateral side.

When the opening portion 210 is closed, the valve plug driving rods 205 are activated to move down the valve plug 201 with a gap interposed between the valve plug 201 and the valve seat 211. The valve plug 201 comes into contact with a stopper 212 below the opening portion 210, but the valve plug driving rods 205 move down further against the action of the springs 207. Consequently, the rollers 206 slightly shift the side plates 202 through the first guide grooves 203 toward the opening portion 210, and finally push the valve plug 201 against the valve seat 211.

When the opening portion 210 is opened, the valve plug driving rods 205 move up. At this time, the rollers 206 move up in the respective first guide grooves 203 by the springs 207 to separate the valve plug 201 from the valve seat 212. Then, the valve plug driving rods 205 further move up, so that the valve plug 201 moves up with the gap kept between the valve plug 201 and the opening portion 210 to return the initial state, while the rollers 206 maintain the state shown in FIG. 11B.

The gate valve 200 shown FIGS. 11A and 11B, i.e., disclosed in Jpn. Pat. Appln. KOKAI Publication No. 10-159999, employs the first and second guide grooves 203 and 204 to realize the up/down movement of the valve plug 201, and its movement to/from the opening portion. As a result, this structure requires the guide grooves to be worked with high accuracy, and also entails a problem in that particles are easily generated near the valve plug 201 and the opening portion 210.

DISCLOSURE OF INVENTION

An object of the present invention is to provide a gate valve for a semiconductor processing system, which hardly generates particles near a valve seat (opening portion) and a valve plug.

According to a first aspect of the present invention, there is provided a gate valve for a semiconductor processing system, comprising:

a base frame configured movable in a first direction to move toward and away from a valve seat, which surrounds an opening portion and has a first seal surface facing a first reference plane;

a first stopper configured to define a movement limit of the base frame on the valve seat side;

a swing frame attached to the base frame, and configured rotatable on a second reference plane perpendicular to the first reference plane;

a valve plug attached to the swing frame, and having a second seal surface to engage with the first seal surface thereby to close the opening portion;

a link mechanism connecting the swing frame to the base frame, and configured to bend and stretch while flexing an intermediate portion;

a driving mechanism connected to the intermediate portion, and configured to move the intermediate portion in the first direction; and a biasing member configured to apply a resistant force against rotation of the swing frame relative to the base frame, wherein, it is preset that, when the opening portion is closed, the intermediate portion is moved by the driving mechanism toward the valve seat to first cause the base frame to move until the base frame comes into contact with the first stopper, and then cause the link mechanism to bend or stretch thereby to rotate the swing frame, such that the valve plug seats itself on the valve seat, and the first and second seal surfaces engage with each other.

In a second aspect, there is provided an apparatus according to the first aspect, further comprising a guide fixed relative to the valve seat, wherein the base frame moves along the guide.

In a third aspect, there is provided an apparatus according to the first aspect, further comprising a damper disposed between the base frame and the swing frame to absorb an impact caused when the swing frame rotates relative to the base frame by an action of the biasing member.

In a fourth aspect, there is provided an apparatus according to the first aspect, wherein the driving mechanism comprises a reciprocation rod connected to the intermediate portion.

In a fifth aspect, there is provided an apparatus according to the fourth aspect, wherein the reciprocation rod penetrates a slit hole formed in the intermediate portion, and the reciprocation rod is movable relative to the intermediate portion in a range allowed by the slit hole.

In a sixth aspect, there is provided an apparatus according to the fourth aspect, wherein the reciprocation rod is connected to the intermediate portion by a position adjusting mechanism, such that a connecting position of the reciprocation rod relative to the intermediate portion is adjustable by the position adjusting mechanism.

In a seventh aspect, there is provided an apparatus according to the fourth aspect, wherein one end limit of a stroke of the reciprocation rod is set to correspond to a bend-and-stretch state of the link mechanism formed when the valve plug seats itself on the valve seat.

In an eighth aspect, there is provided an apparatus according to the first aspect, further comprising a second stopper configured to define a movement limit of the intermediate portion on the valve seat side to correspond to a bend-and-stretch state of the link mechanism formed when the valve plug seats itself on the valve seat.

In a ninth aspect, there is provided an apparatus according to the eighth aspect, wherein the second stopper is fixed to the base frame.

In a tenth aspect, there is provided an apparatus according to the first aspect, wherein the biasing member connects the swing frame to the base frame.

In an eleventh aspect, there is provided an apparatus according to the first aspect, wherein the link mechanism comprises first and second levers connected to the base frame and the swing frame, respectively, to be pivotable on the second reference plane, and the intermediate portion connects the first and second levers to be pivotalbe to each other on the second reference plane.

In a twelfth aspect, there is provided an apparatus according to the first aspect, wherein the first direction is substantially parallel to the first reference plane.

In a thirteenth aspect, there is provided an apparatus according to the first aspect, wherein the valve plug and the link mechanism are connected to the swing frame at first and second positions, respectively, sandwiching a position at which the swing frame is attached to the base frame.

In a fourteenth aspect, there is provided an apparatus according to the first aspect, wherein the opening portion is formed in a sidewall of an airtight chamber, in which a target substrate is accommodated, and the opening portion is formed to allow the target substrate to pass therethrough.

In a fifteenth aspect, there is provided an apparatus according to the fourteenth aspect, wherein the valve seat and the valve plug are arranged to isolate a vacuum atmosphere inside the airtight chamber from an atmospheric environment outside the airtight chamber.

According to a sixteenth aspect of the present invention, there is provided a gate valve for a semiconductor processing system, comprising:

a base frame configured movable in a first direction to move toward and away from a valve seat, which surrounds an opening portion and has a first seal surface facing a first reference plane;

a first stopper configured to define a movement limit of the base frame on the valve seat side;

a swing frame attached to the base frame, and configured rotatable on a second reference plane perpendicular to the first reference plane;

a valve plug attached to the swing frame, and having a second seal surface to engage with the first seal surface thereby to close the opening portion;

a link mechanism connecting the swing frame to the base frame, and configured to bend and stretch while flexing an intermediate portion, the link mechanism comprising first and second levers connected to the base frame and the swing frame, respectively, to be pivotable on the second reference plane, the intermediate portion connecting the first and second levers to be pivotalbe to each other on the second reference plane;

a driving mechanism comprising a reciprocation rod connected to the intermediate portion, and configured to move the intermediate portion in the first direction; and a biasing member connecting the swing frame to the base frame, and configured to apply a resistant force against rotation of the swing frame relative to the base frame, wherein, it is preset that, when the opening portion is closed, the intermediate portion is moved by the driving mechanism toward the valve seat to first cause the base frame to move until the base frame comes into contact with the first stopper, and then cause the link mechanism to bend or stretch thereby to rotate the swing frame, such that the valve plug seats itself on the valve seat, and the first and second seal surfaces engage with each other.

BEST MODE FOR CARRYING OUT OF THE INVENTION

The embodiments of the present invention will be described hereinafter with reference to the accompanying drawings. In the following description, the constituent elements having substantially the same function and arrangement are denoted by the same reference symbols, and a repetitive description will be made only when necessary.

Figure 1A:
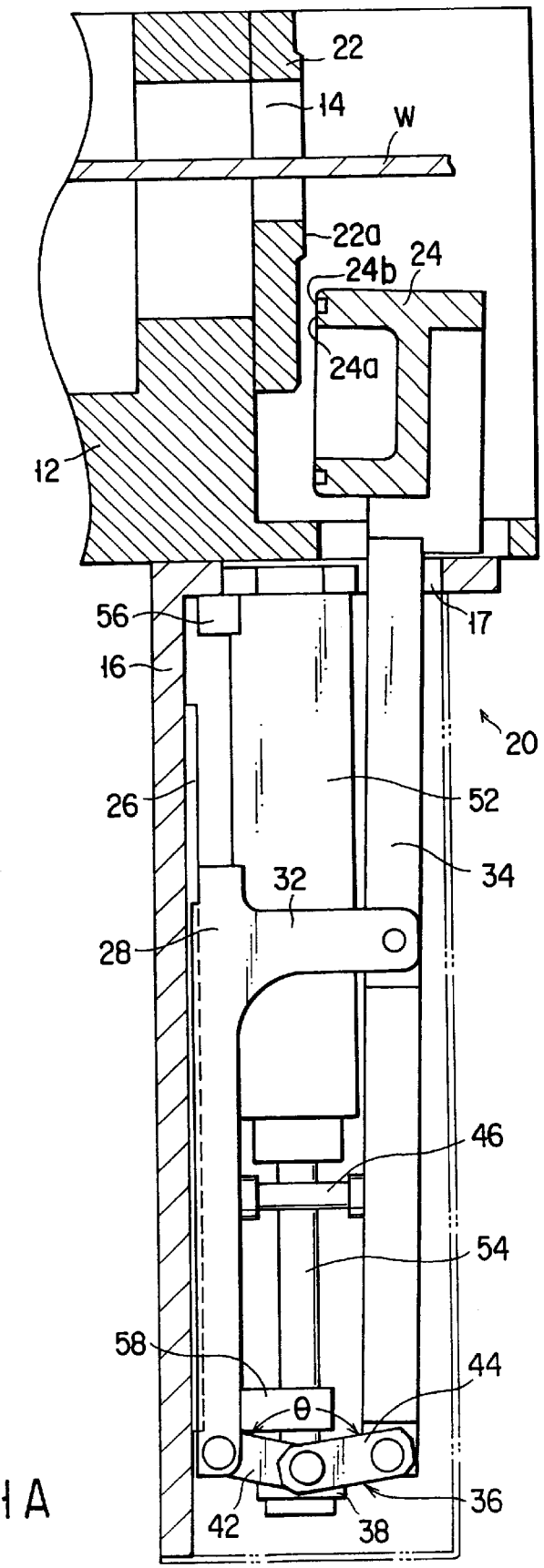
FIGS. 1A to 1C are sectional side views schematically showing the structure of a gate valve for a semiconductor processing system according to a first embodiment of the present invention.
Figure 1B:
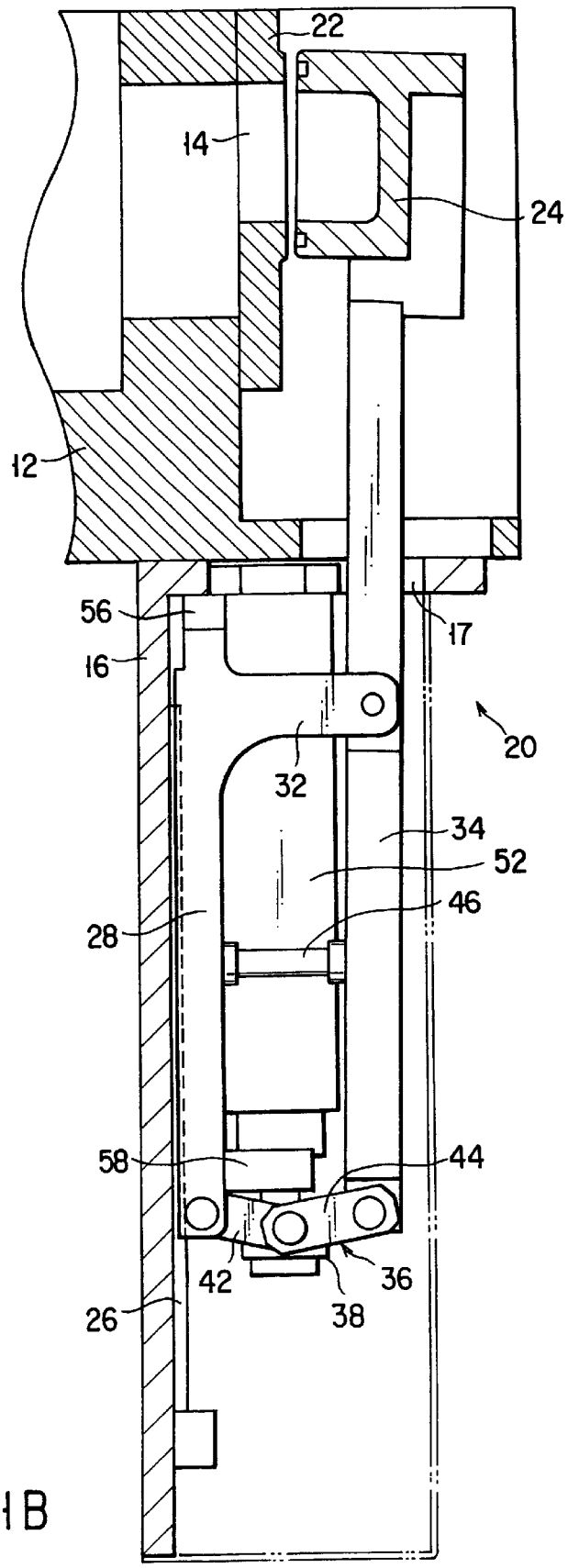
Figure 1C:
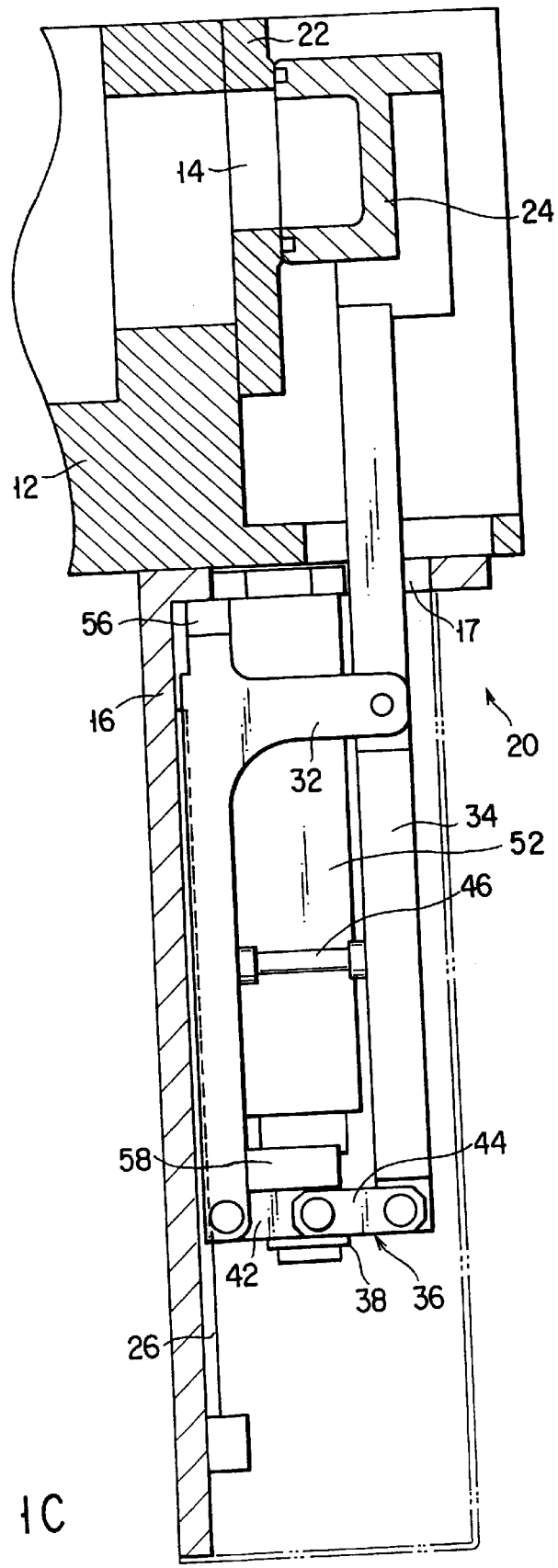
Figure 2:
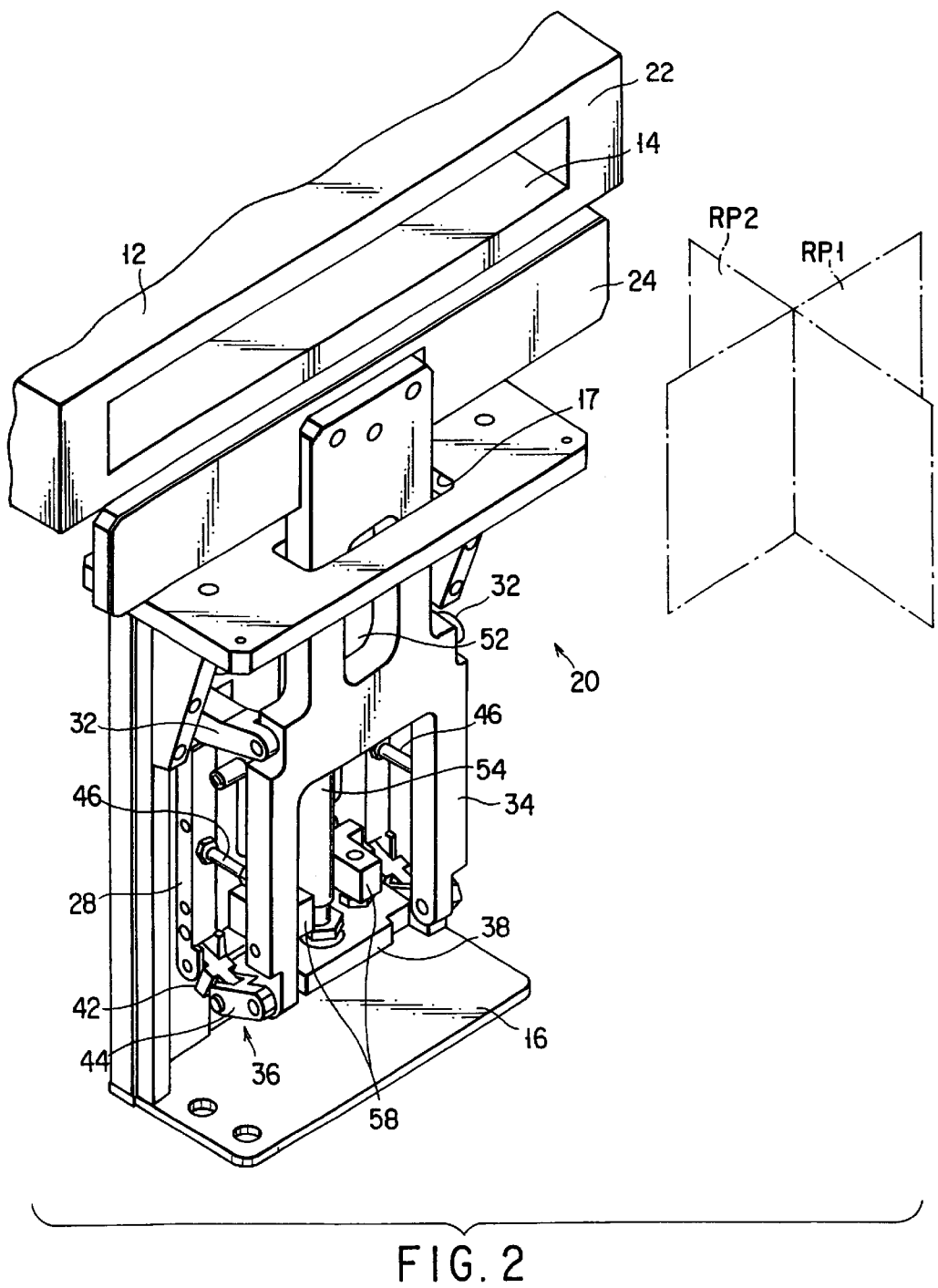
FIG. 2 is a perspective view showing the internal structure of the gate valve according to the first embodiment viewed from above, in a state where an opening portion is open.
Figure 3:
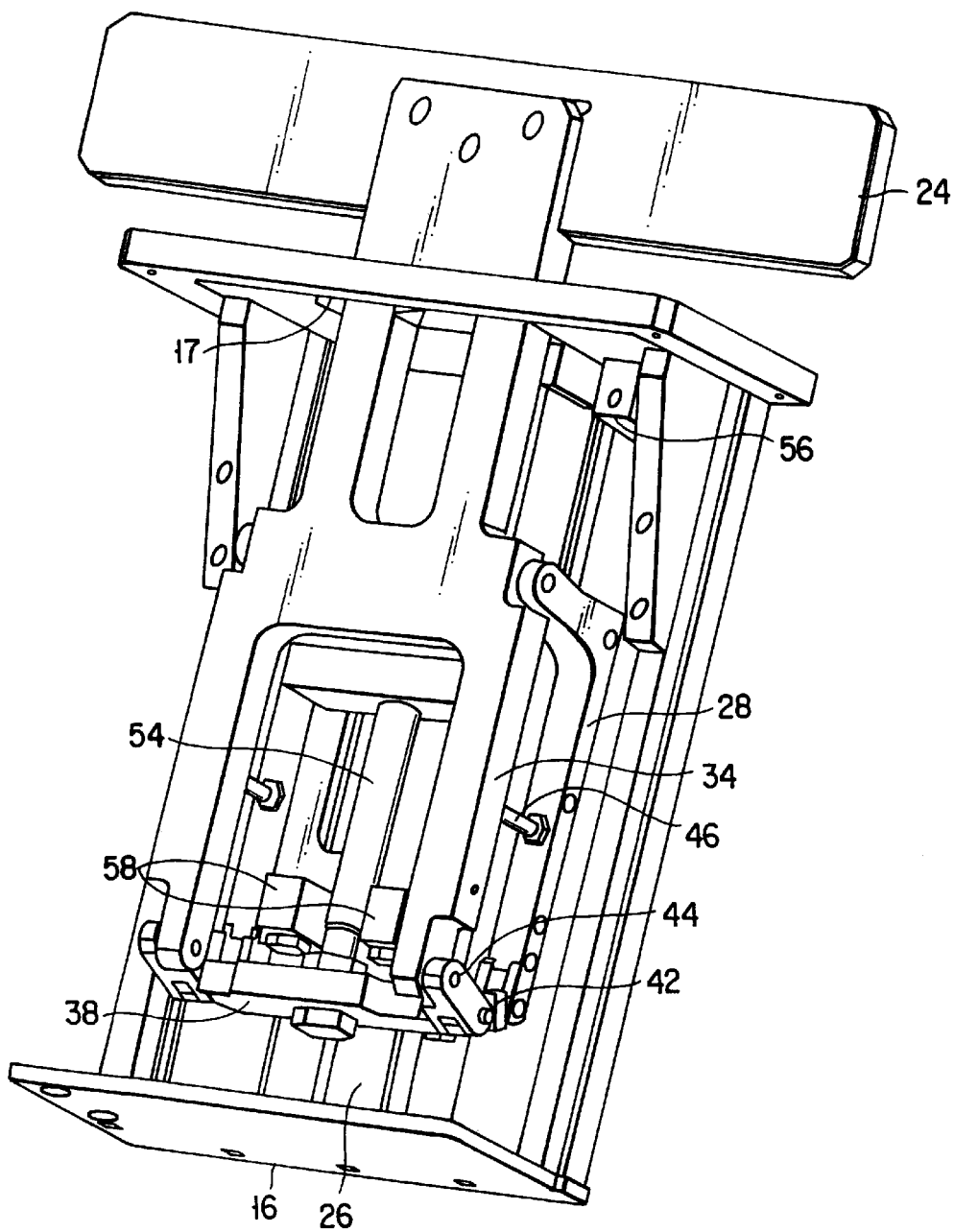
FIG. 3 is a perspective view showing the internal structure shown in FIG. 2 viewed from below, in the state shown in FIG. 2.
Figure 4:
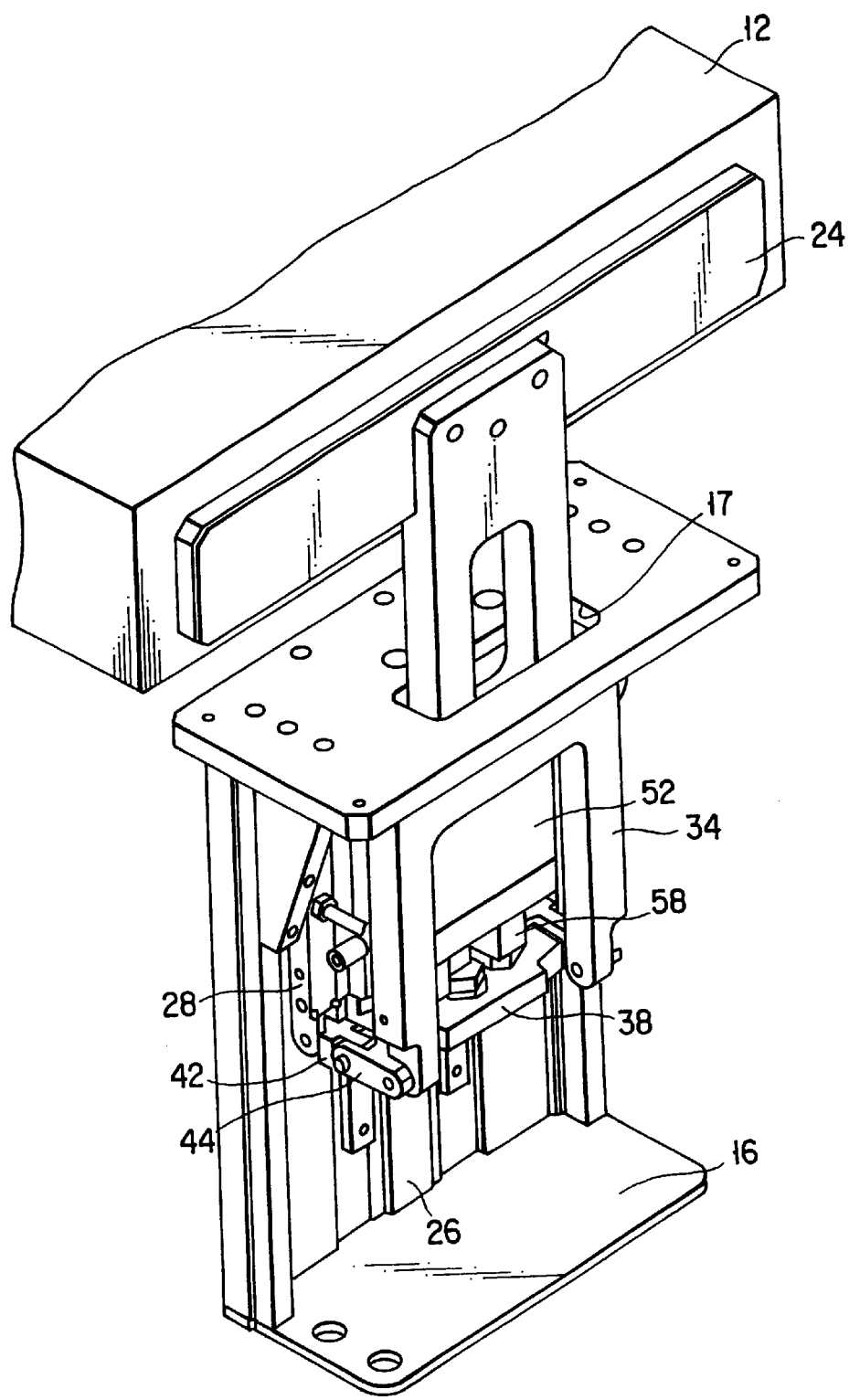
FIG. 4 is a perspective view showing the internal structure shown in FIG. 2 viewed from above, in a state where the opening portion is closed.
Figure 5:
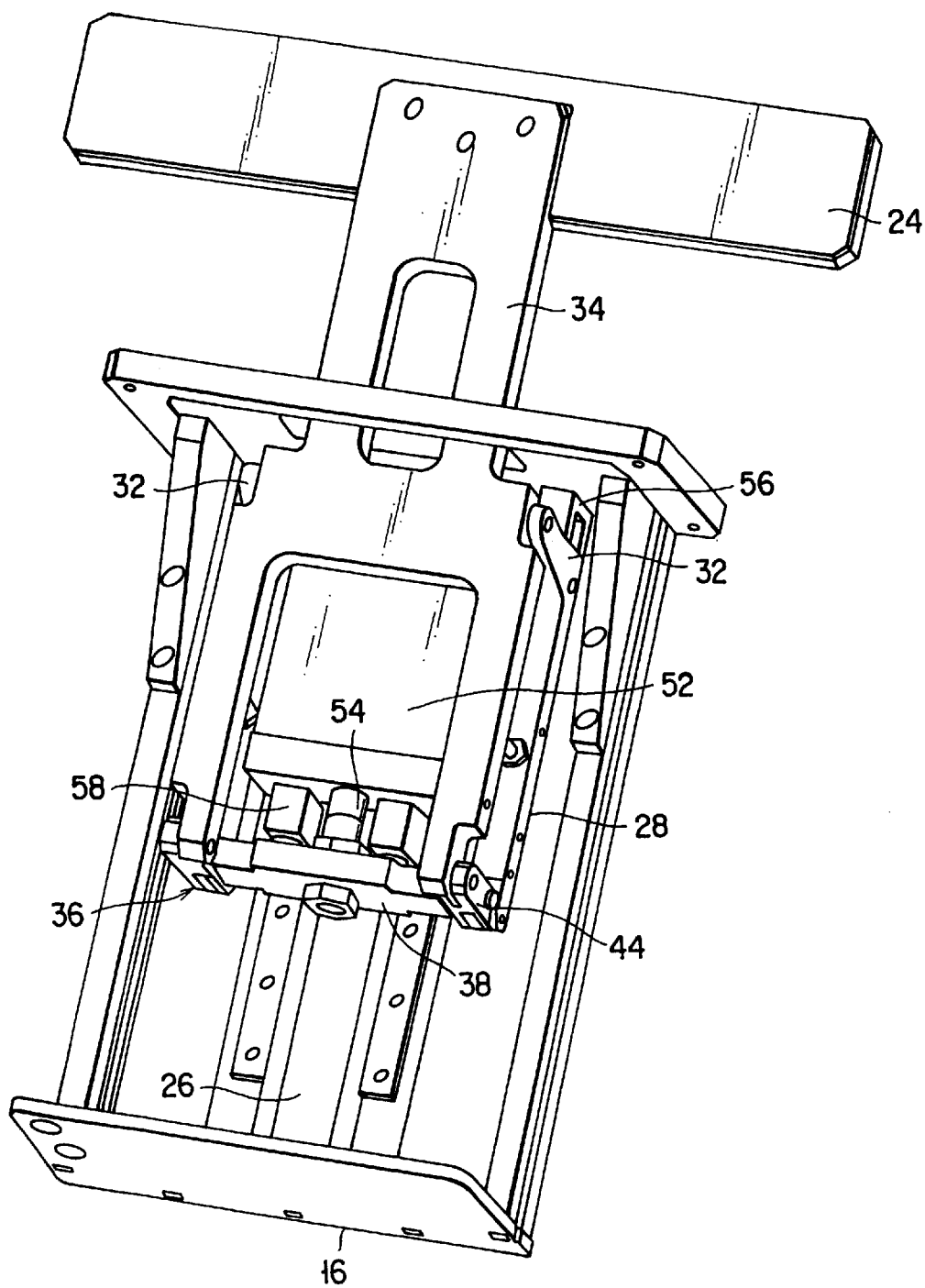
FIG. 5 is a perspective view showing the internal structure shown in FIG. 2 viewed from below, in the state shown in FIG. 4.

FIGS. 1A to 1C are sectional side views schematically showing the structure of a gate valve for a semiconductor processing system according to a first embodiment of the present invention. FIGS. 2 and 3 are perspective views showing the internal structure of the gate valve according to the first embodiment, viewed from above and from below, respectively, in a state where an opening portion is open. FIGS. 4 and 5 are perspective views showing the internal structure shown in FIG. 2, viewed from above and from below, respectively, in a state where the opening portion is closed.

In this embodiment, a gate valve 20 is disposed adjacent to an opening portion 14, which is formed in the sidewall of an airtight load lock chamber 12, for example. The load lock chamber 12 is connected to a process chamber on the side reverse to the opening portion 14, in a film formation apparatus, an etching apparatus, or the like. Typically, the opening portion 14 is used for allowing a target substrate W, such as a semiconductor wafer, an LCD substrate, or the like, to pass therethrough.

The side wall of the load lock chamber 12 is provided with a valve seat 22 disposed thereon, which surrounds the opening portion 14, to airtightly close and open the opening portion 14 in cooperation with a valve plug 24 described later. In other words, the valve plug 24 and the valve seat 22 are arranged to isolate a vacuum atmosphere inside the load lock chamber 12 from the atmospheric environment outside the load lock chamber 12. The valve seat 22 has a first seal surface 22a, which is vertical and arranged to engage with the valve plug 24. In order to clarify the structure of the gate valve 20, it is assumed that the first seal surface 22a is arranged opposite to and parallel to a first reference plane RP1 (see FIG. 2), which is vertical.

A casing 16 is detachably fixed to the load lock chamber 12 below the opening portion 14, for accommodating main parts of the gate valve 20. Although FIGS. 2 to 5 show only part of the casing 16 to expose the internal structure of the gate valve 20, the casing 16 is actually arranged to cover the internal structure. The sidewall of the casing 16 on the load lock chamber 12 side (the left side in FIGS. 1A to 1C) is provided with a guide 26 disposed thereon, which extends vertically downward in parallel to the first reference plane RP1. In other words, the guide 26 is fixed relative to the valve seat 22.

The base frame 28 is attached to the guide 26 to move vertically along the guide 26, so that it can move toward and away from the valve seat 22. The base frame 28 has a pair of arms 32 at the upper end, which extend horizontally toward the side reverse to the load lock chamber 12, and have distal ends pivotally supporting a swing frame 34. More specifically, the swing frame 34 is attached to the base frame 28 by means of, e.g., pin connection to be rotatable on a second reference plane RP2 (see FIG. 2), which is vertical and perpendicular to the first reference plane RP1

The swing frame 34 penetrates an opening portion 17 formed in the casing 16, and extends upward to its upper end to which the valve plug 24 is attached. The valve plug 24 has a second seal surface 24a to engage with the first seal surface 22a of the valve seat 22, so as to close the opening portion 14. The seal surface 24a of the valve plug 24 is provided with an O-ring 24b for airtightly sealing the opening portion 14.

The swing frame 34 is connected to the base frame 28 at the lower end by a pair of link mechanisms 36. Each of the link mechanisms 36 can bend and stretch while flexing an intermediate portion. More specifically, each of the link mechanisms 36 includes first and second levers 42 and 44, which are connected to the base frame 28 and the swing frame 34, respectively, by means of, e.g., pin connection, so that they are pivotable on the second reference plane RP2. The first and second levers 42 and 44 are connected to each other by means of, e.g., pin connection, so that they are pivotable relative to each other on the second reference plane RP2, using a mediation member 38 for forming the intermediate portions at which the respective link mechanisms 36 can bend.

The swing frame 34 is also connected to the base frame 28 by a spring and damper member 46 between the arms 32 of the base frame 28 and the link mechanisms 36. On the one hand, the member 46 functions as a tension spring (biasing member) for applying a resistant force against rotation of the swing frame 34 relative to the base frame 28. On the other hand, the member 46 functions as a damper for absorbing an impact caused when the swing frame 34 rotates relative to the base frame 28 by the action of the tension spring of the member 46.

An air actuator 52 is fixed to the casing 16 between the base frame 28 and the swing frame 34, and functions as a driving mechanism for driving the valve plug 24. The air actuator 52 has a rod 54, which extends downward and vertically reciprocates in the space between the base frame 28 and the swing frame 34. The lower end of the rod 54 is connected to the mediation member 38 of the link mechanisms 36 by means of, e.g., screw and nut connection.

A pair of first stoppers 56 are disposed at the upper end of the guide 26, for defining the movement limit of the base frame 28 along the guide 26 on the valve seat 22 side. A pair of the second stoppers 58 are disposed on the base frame 28 slightly above the link mechanism 36, for defining the movement limit of the mediation member 38 on the valve seat 22 side.

An explanation will be given of an operation of the gate valve 20. The following drive of the air actuator 52 is performed under the control of a controller (not shown).

As shown in FIG. 1A, when the opening portion 14 of the load lock chamber 14 is opened, the rod 54 of the air actuator 52 is extended the most. Accordingly, the base frame 28 is positioned at the lower end of the guide 26, and the link mechanisms 36 bend the most in the operation range. As a result, the swing frame 34 is not in a vertical state, but in a state where it has slightly rotated clockwise about the axial point at the distal ends of the arms 32, and inclines in the casing 16.

Then, when the opening portion 14 is closed, the rod 54 of the air actuator 52 is withdrawn, and the mediation member 38 of the link mechanisms 36 is pulled toward the valve seat 22. At this time, since the spring and damper member 46 applies a resistant force against rotational movement of the swing frame 34 relative to the base frame 28, thereby not allowing the link mechanisms 36 to stretch (not allowing the interior angle θ between the first and second levers 42 and 44 to be larger), the base frame 28 begins to move upward along the guide 26 at first. The base frame 28 keeps moving upward along the guide 26 until the base frame 28 comes into contact with the first stoppers 56, as shown in FIG. 1B. It is preset that, when the base frame 28 comes into contact with the first stoppers 56, the valve plug 24 exactly comes to a position facing the valve seat 22 with a small gap therebetween.

Even after the base frame 28 comes into contact with the first stoppers 56, the rod 54 of the air actuator 52 is further withdrawn, so that the mediation member 38 is pulled toward the valve seat 22 while the base frame 28 being stopped. Consequently, the link mechanisms 36 stretch (the interior angle θ between the first and second levers 42 and 44 becomes larger), the swing frame 34 rotates counterclockwise about the axial point at the distal ends of the arms 32. As a result, as shown in FIG. 1C, the valve plug 24 moves toward the valve seat 22 and seats itself on the valve seat 22, so that the first and second seal surfaces 22a and 24a engage with each other to close the opening portion 14.

Simply put, the movement of the gate valve 20 to close the opening portion 14 is formed of two stages. In the first stage, the base frame 28 and the swing frame 34 as a whole move upward by withdrawal of the rod 54, until the base frame 28 stops at the first stoppers 56. In the second stage, after the base frame 28 stops, only the mediation member 38 moves upward by withdrawal of the rod 54, until the mediation member 38 stops at the second stoppers 58.

In the second stage, as the mediation member 38 moves upward and the link mechanism 36 stretches, the valve plug 24 moves forward by the swing frame 34 to close the opening portion 14 at the upper end of its upward movement, as shown in FIGS. 1C and 4. Accordingly, it is preset that a bend-and-stretch state of the link mechanisms 36 formed when the valve plug 24 seats itself on the valve seat 22 accords with the movement limit of the mediation member 38 of the link mechanisms 36 on the valve seat 22 side, which is defined by the second stoppers 58.

On the other hand, when the opening portion 14 is opened, the gate valve 20 is operated in two stages through a sequence reverse to that described above. Specifically, as the rod 54 is extended, the link mechanisms 36 are first bent by the action of the spring and damper member 46. Consequently, the valve plug 24 moves backward by the swing frame 34 to separate from the opening portion 14 at the upper end of its upward movement, as shown in FIG. 1B. At this time, the base frame 28 maintains a state where it stops at the first stoppers 56. Then, the rod 54 is extended, and the base frame 28 and the swing frame 34 as a whole move downward to completely open the opening portion 14, as shown in FIGS. 1A and 2.

In the gate valve 20 according to the first embodiment, the valve plug 24 is isolated from and far from the driving section, and does not come into contact with any portion other than the valve seat 22. As a result, particles are prevented from being generated near the valve seat 22 and the valve plug 24, so that the interior of the load lock chamber 12 is unlikely to be contaminated with particles. A fan (not shown) is disposed under the casing 16, so that air flowing into the casing 16 through the opening portion 17 on the upper side is forced to flow downward from the casing 16. Consequently, particles generated in the driving section are prevented from flowing toward the valve seat 22 and the valve plug 24.

Figure 6A:
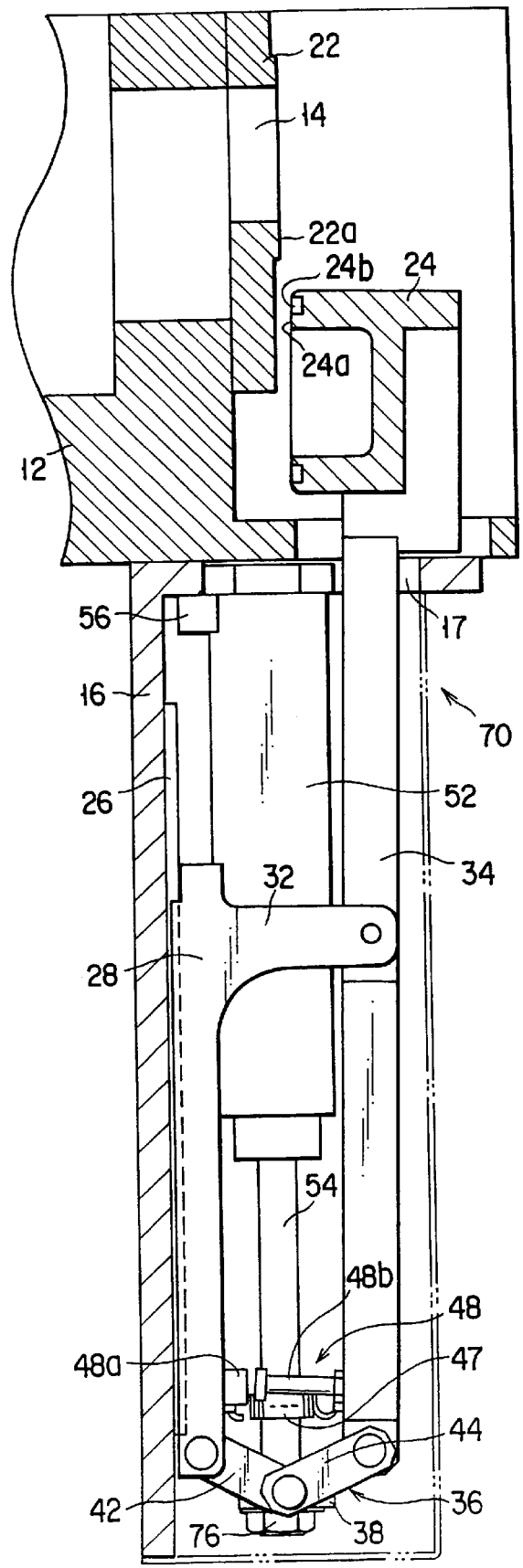
FIGS. 6A to 6C are sectional side views schematically showing the structure of a gate valve for a semiconductor processing system according to a second embodiment of the present invention.
Figure 6B:
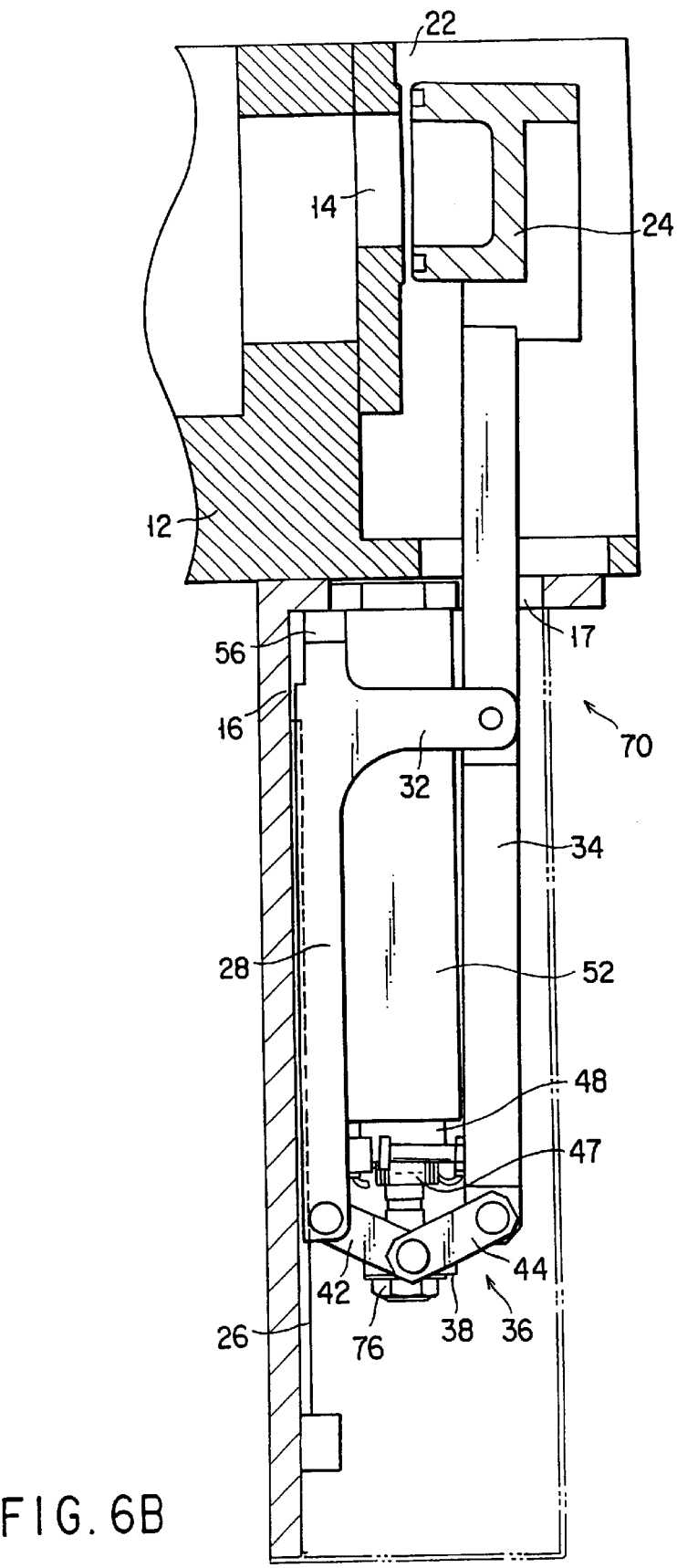
Figure 6C:
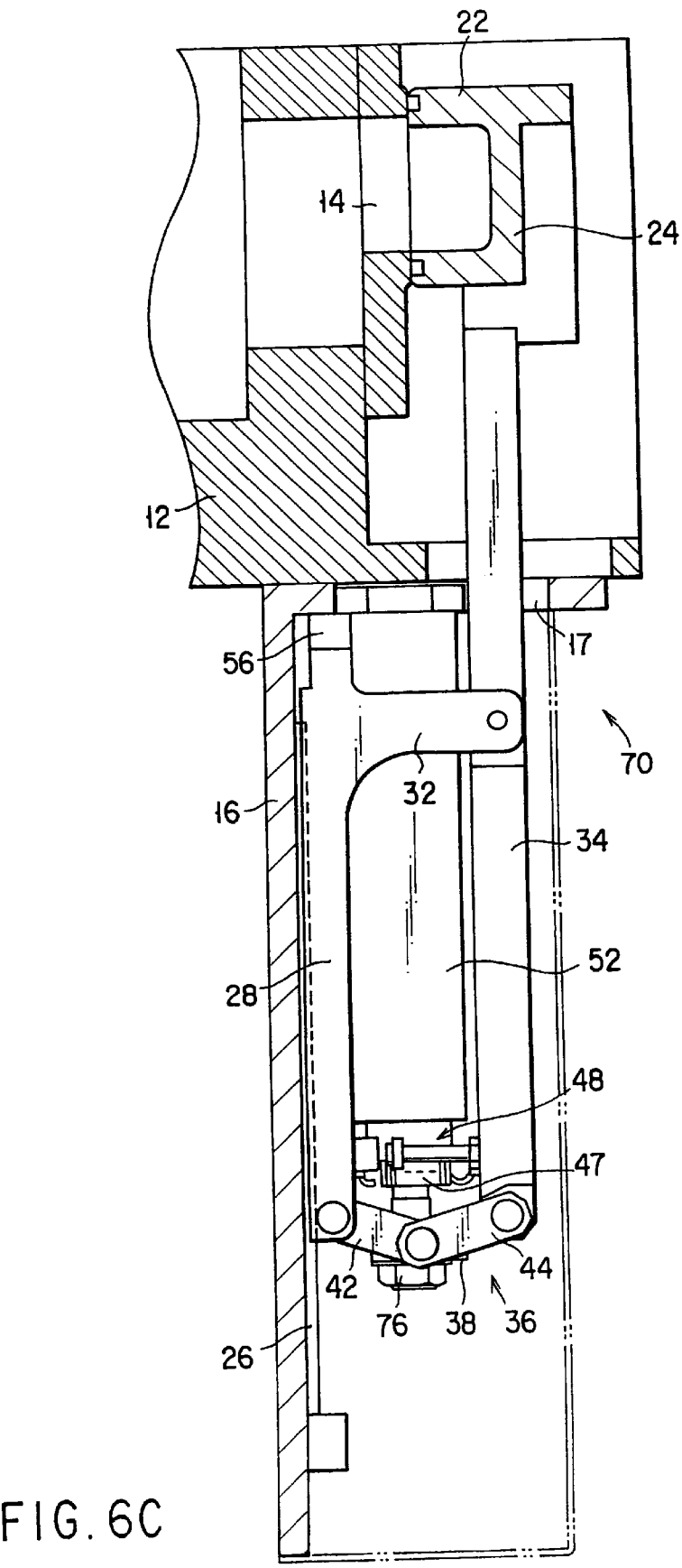

FIGS. 6A to 6C are sectional side views schematically showing the structure of a gate valve for a semiconductor processing system according to a second embodiment of the present invention. The gate valve 70 according to this embodiment has an arrangement substantially the same as that of the gate valve 20 according to the first embodiment in relation to the main components, but differs in several respects.

Specifically, the gate valve 70 according to this embodiment employs no second stoppers 58 for defining the movement limit of a mediation member 38 of link mechanisms 36 on a valve seat 22 side. Instead, one end limit of the stroke of the reciprocation rod 54 of an air actuator 52 is set to correspond to a bend-and-stretch state of the link mechanisms 36 formed when a valve plug 24 seats itself on the valve seat 22. In other words, it is preset that, when the rod 54 is withdrawn the most, the valve plug 24 exactly seats itself on the valve seat 22.

Figure 7A:
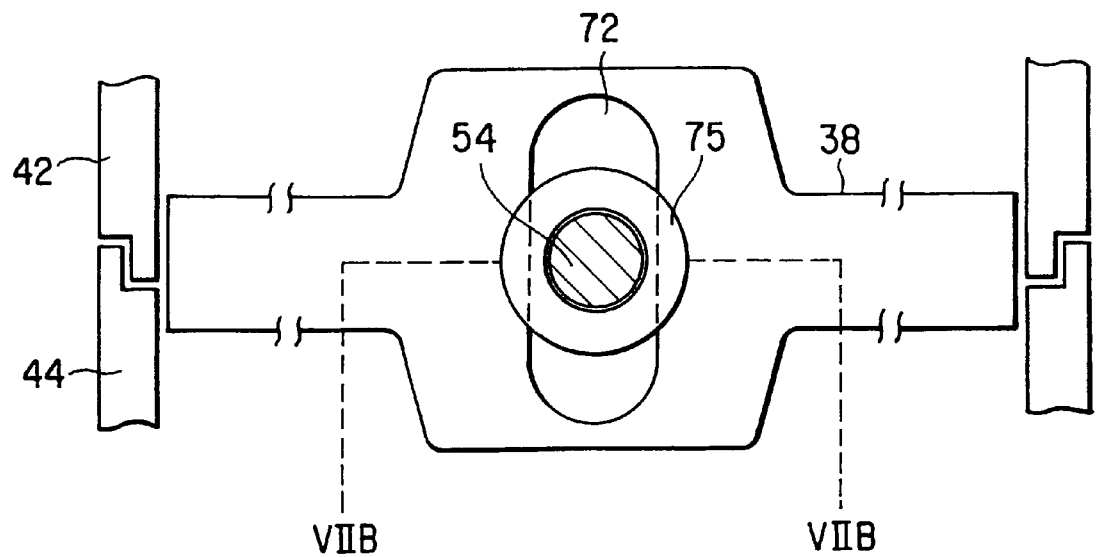
FIGS. 7A and 7B are a plan view and a sectional front view, respectively, schematically showing the relationship between the reciprocation rod of an air actuator and the mediation member of a link mechanism, in the gate valve according to the second embodiment.
Figure 7B:
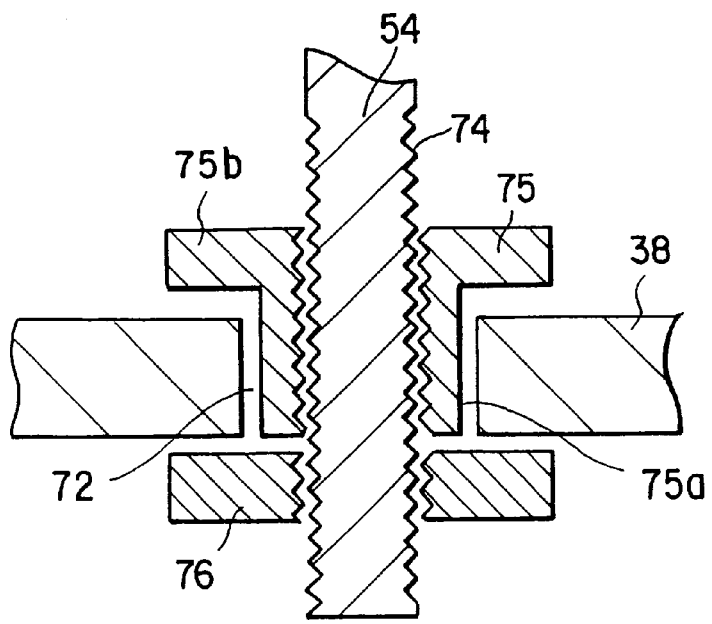

Furthermore, as shown in FIG. 7A, the mediation member 38 of the link mechanisms 36 is provided with a slit hole 72 formed therein, which is long in a direction parallel to the second reference plane RP2 (see FIG. 2), (i.e., in a direction in which the link mechanisms 36 bend and stretch), and the distal end of the rod 54 penetrates the slit hole 72. As shown in FIG. 7B, the distal end of the rod 54 penetrating the slit hole 72 is provided with a male screw portion 74 over a sufficient length.

A sleeve nut 75 having a sleeve portion 75a and a flange portion 75b is screwed onto the male screw portion 74 from above the mediation member 38. A through-nut 76 having an outer diameter larger than the width of the slit hole 72 is also screwed onto the male screw portion 74 from below the mediation member 38. The sleeve portion 75a penetrates the slit hole 72, and the lower nut 76 is screwed on the male screw portion 74 until it comes into contact with the sleeve portion 75a. It is preset that a small gap is formed between each of the sleeve portion 75a, the flange portion 75b and the nut 76, and the corresponding portion of the mediation member 38. Accordingly, the rod 54 can move along with the sleeve nut 75 and the through-nut 76 in the slit hole 72.

With this arrangement, the rod 54 and the mediation member 38 can move substantially integratedly in the longitudinal direction of the rod 54, while they can move relative to each other on the second reference plane RP2 (in the bend-and-stretch direction of the link mechanism 36) in a range allowed by the slit hole 72. When the valve is being opened and closed, the position of the mediation member 38 slightly shifts in a direction along the slit hole 72 by the bend-and-stretch movement of the link mechanism 36. Accordingly, where the slit hole 72 is formed, a lateral load applied to the rod 54 due to the bend-and-stretch movement of the link mechanism 36 is relaxed.

The male screw portion 74 at the distal end of the rod 54, the sleeve nut 75, and the through-nut 76 function as a position adjusting mechanism. Specifically, the connecting position of the rod 54 to the mediation member 38 can be adjusted by this position adjusting mechanism. Even where the stroke of the reciprocation rod 54 of the air actuator 52 is fixed, the stroke length of the rod 54 can be substantially adjusted by the position adjusting mechanism. Accordingly, one end limit of the stroke of the reciprocation rod 54 of the air actuator 52 can be easily set to correspond to a bend-and-stretch state of the link mechanisms 36 formed when a valve plug 24 seats itself on the valve seat 22.

Furthermore, in the gate valve 70, a tension spring 47 and a damper 48 are separately disposed, in place of the spring and damper member 46 described above. The spring 47 is directly connected to the base frame 28 and the swing frame 34 at opposite ends. The damper 48 has a urethane bump 48a attached to the base frame 28, and a pin 48b attached to the swing frame 34 at a position corresponding to the urethane bump 48a. The damper 48 defines the bend limit of the link mechanisms 36, and also absorbs an impact caused when the link mechanisms 36 bend and the swing frame 34 rotates.

The operation principle of the gate valve 70 is basically the same as that of the gate valve 20. Accordingly, also in the gate valve 70, the valve plug 24 is isolated from and far from the driving section, and does not come into contact with any portion other than the valve seat 22. As a result, particles are prevented from being generated near the valve seat 22 and the valve plug 24, so that the interior of a load lock chamber 12 is unlikely to be contaminated with particles.

Figure 8A:
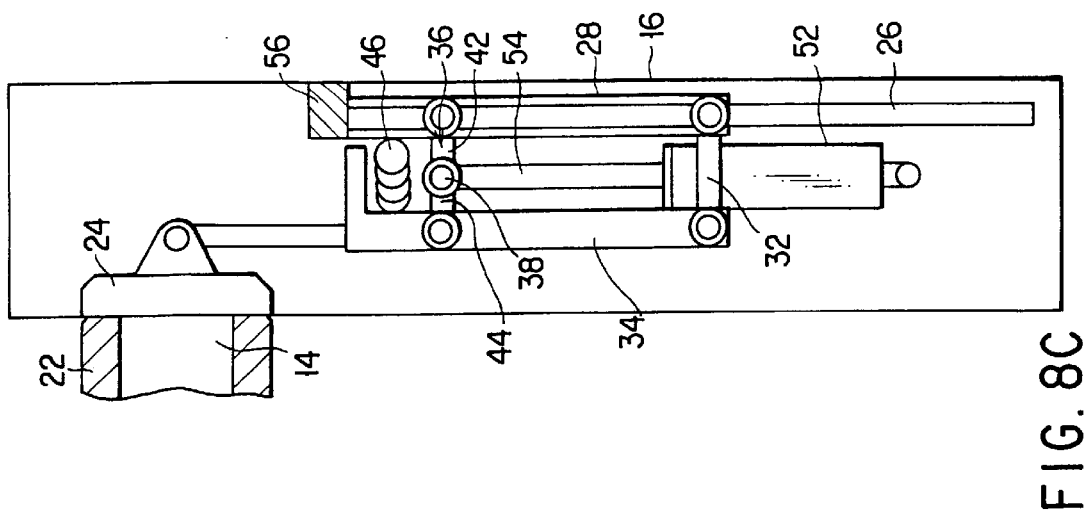
FIGS. 8A to 8C are sectional side views schematically showing the structure of a gate valve for a semiconductor processing system according to a third embodiment of the present invention.
Figure 8B:
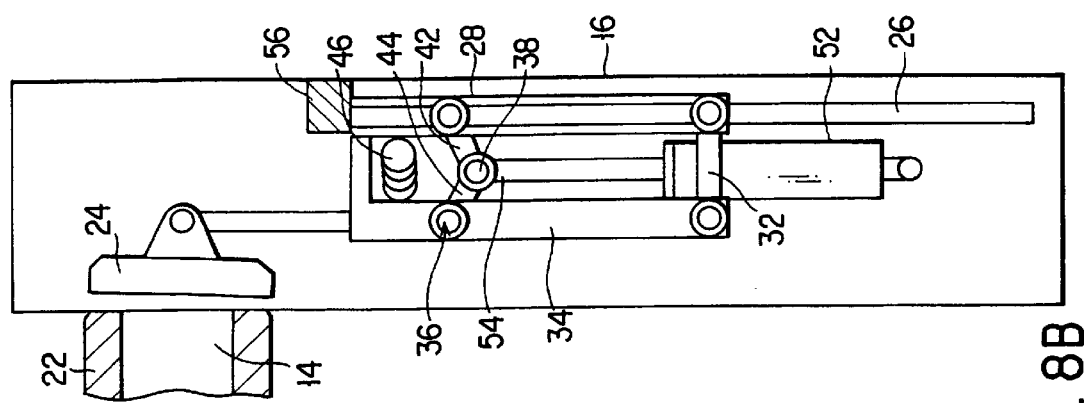
Figure 8C:
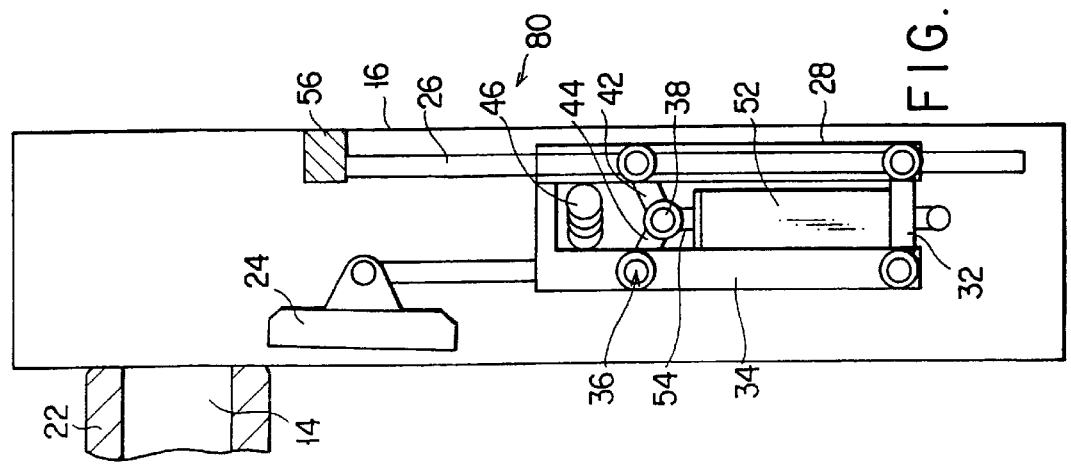

FIGS. 8A to 8C are sectional side views schematically showing the structure of a gate valve for a semiconductor processing system according to a third embodiment of the present invention. The gate valve 80 according to this embodiment has an arrangement in which the disposition of a base frame 28 and a swing frame 34, the orientation of an air actuator 52, and so forth are set reverse to those of the gate valve 20 according to the first embodiment.

More specifically, in the gate valve 80 according to this embodiment, the sidewall of a casing 16 on a side reverse to a load lock chamber 12 side (the right side in FIGS. 8A to 8C) is provided with a guide 26 disposed thereon, which extends vertically downward. A base frame 28 is attached to the guide 26 to move vertically along the guide 26. The base frame 28 has a pair of arms 32 at the lower end, which extend horizontally toward the load lock chamber 12, and have distal ends pivotally supporting a swing frame 34.

The valve plug 24 is attached to the upper end of the swing frame 34. The swing frame 34 is connected to the base frame 28 near the upper end by a pair of link mechanisms 36. Each of the link mechanisms 36 can bend and stretch while flexing an intermediate portion. More specifically, each of the link mechanisms 36 includes first and second levers 42 and 44, which are pivotally connected to the base frame 28 and the swing frame 34, respectively. The first and second levers 42 and 44 are pivotally connected to each other by a mediation member 38.

The swing frame 34 is also connected to the base frame 28 by a spring and damper member 46 near the upper end. An air actuator 52 is fixed to the casing 16 between the base frame 28 and the swing frame 34. The air actuator 52 has a rod 54, which extends upward and vertically reciprocates in the space between the base frame 28 and the swing frame 34. The upper end of the rod 54 is connected to the mediation member 38 of the link mechanisms 36.

A pair of first stoppers 56 are disposed at the upper end of the guide 26, for defining the movement limit of the base frame 28 along the guide 26 on the valve seat 22 side. The movement limit of the mediation member 38 on the valve seat 22 side is defined by one end limit of the stroke of the reciprocation rod 54 of the air actuator 52.

In the gate valve 80, the swing frame 34 rotates about its lower end. Accordingly, even where the rotation angle of the swing frame 34 is equal to that of the gate valve 20 according to the first embodiment, the valve plug 24 can move back and forth with a larger distance. Also in the gate valve 80, when the rod 54 of the air actuator 52 is withdrawn the most, the opening portion 14 is opened (see FIG. 8A), and when the rod 54 of the air actuator 52 is extended the most, the opening portion 14 is closed (see FIG. 8C).

Although there are several differences other than the matters described above, the operation principle of the gate valve 80 is basically the same as that of the gate valve 20. Accordingly, also in the gate valve 80, the valve plug 24 is isolated from and far from the driving section, and does not come into contact with any portion other than the valve seat 22. As a result, particles are prevented from being generated near the valve seat 22 and the valve plug 24, so that the interior of a load lock chamber 12 is unlikely to be contaminated with particles.

Figure 9A:
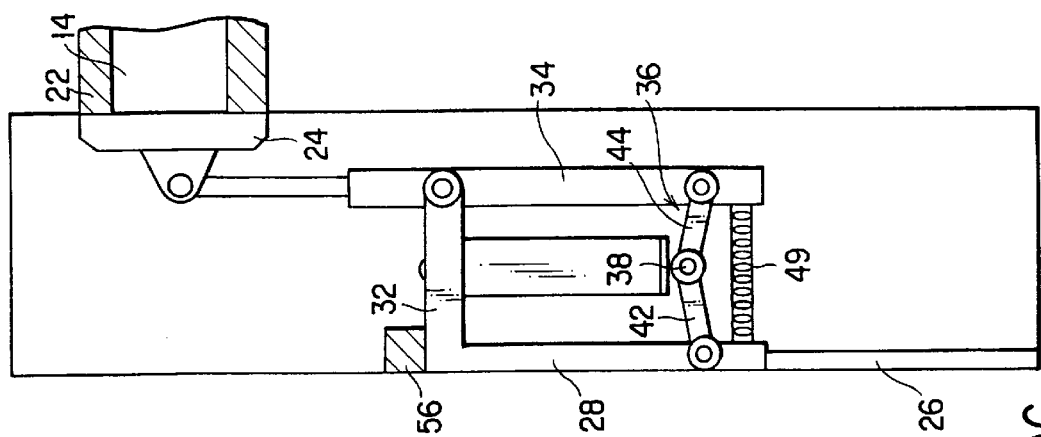
FIGS. 9A to 9C are sectional side views schematically showing the structure of a gate valve for a semiconductor processing system according to a fourth embodiment of the present invention.
Figure 9B:
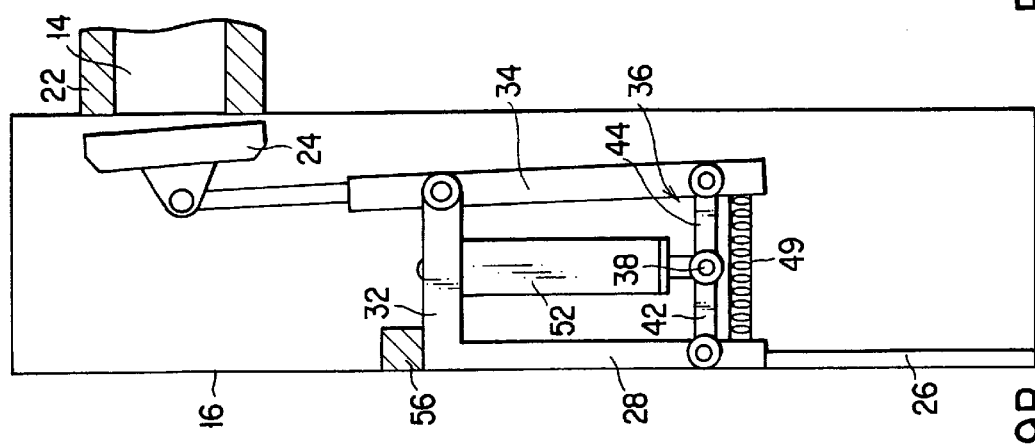
Figure 9C:
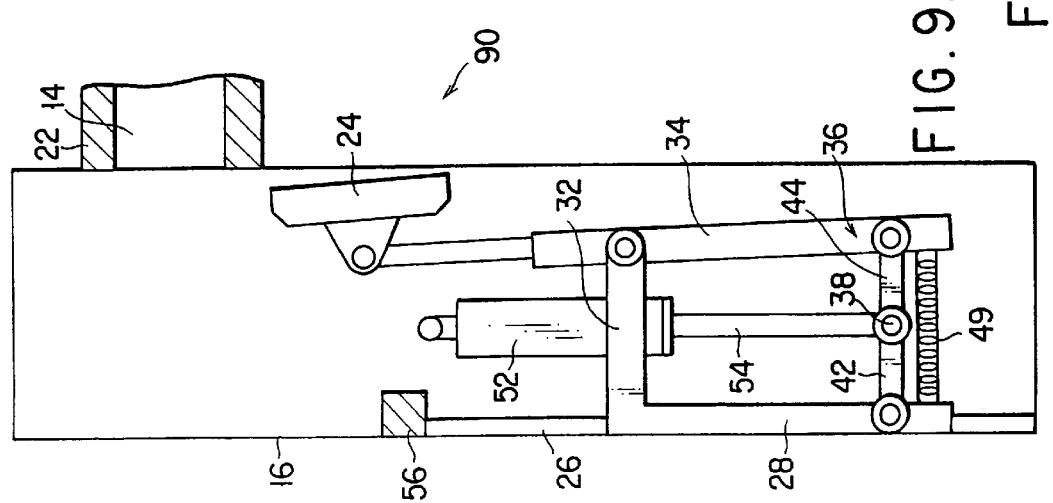
Figure 10:
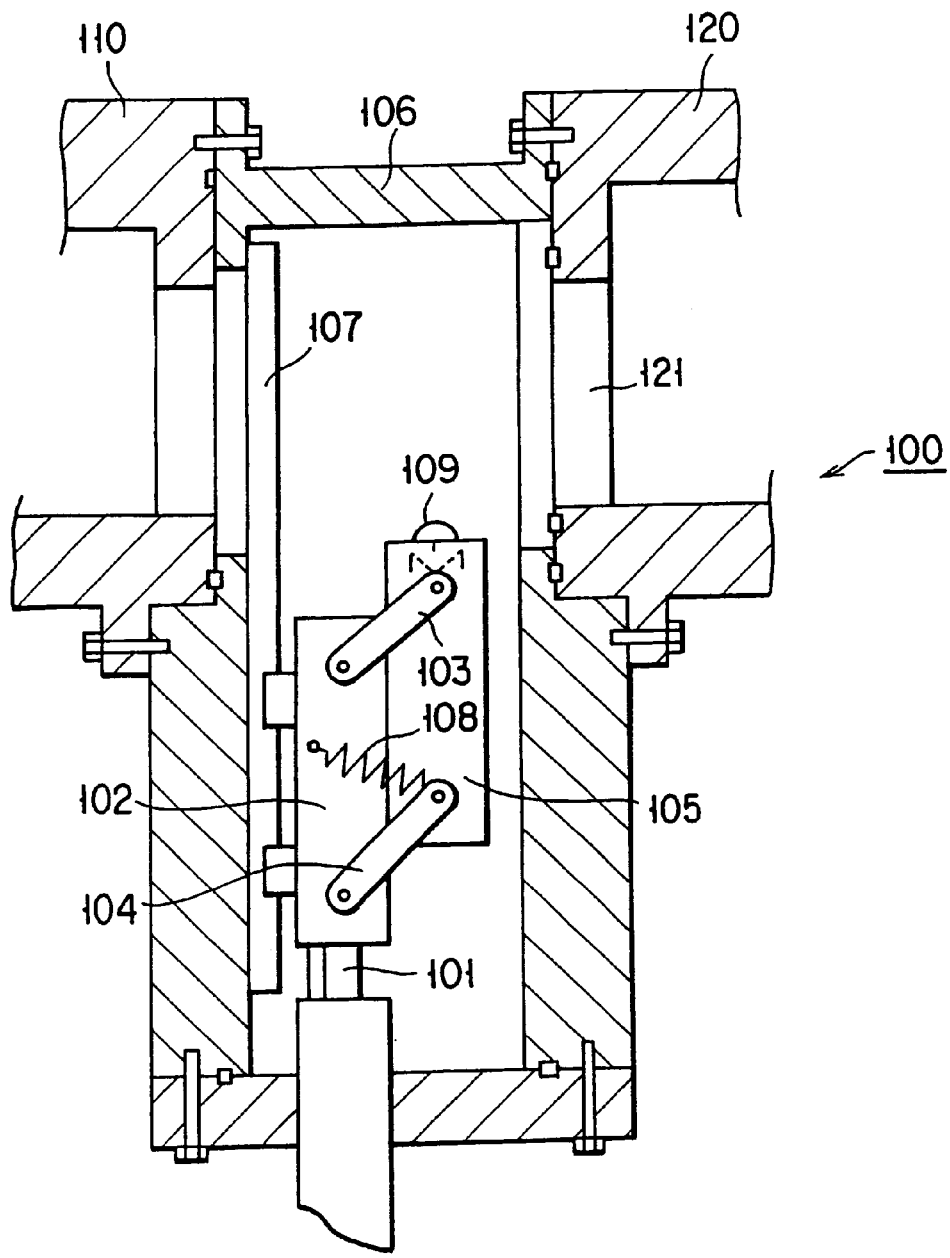
FIG. 10 is a sectional view schematically showing the structure of a conventional gate valve.
Figure 11A:
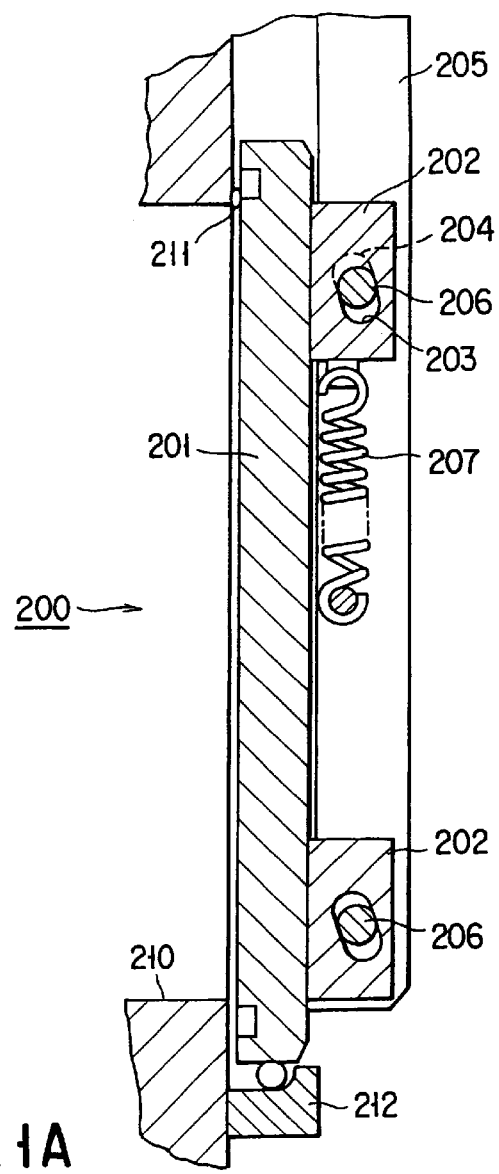
FIGS. 11A and 11B are views schematically showing the structure of another conventional gate valve.
Figure 11B:
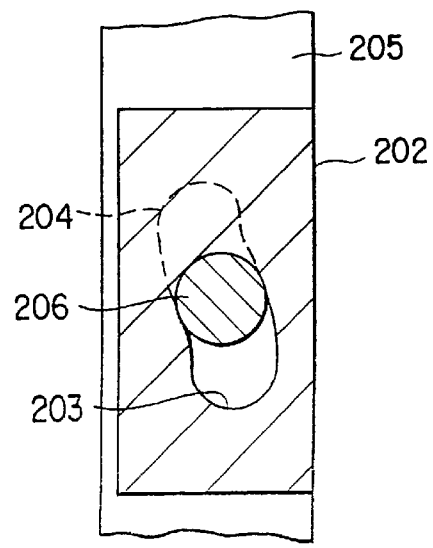

FIGS. 9A to 9C are sectional side views schematically showing the structure of a gate valve for a semiconductor processing system according to a fourth embodiment of the present invention. The gate valve 90 according to this embodiment has an arrangement in which, as compared with the gate valve 20 according to the first embodiment, a compression spring is used in place of the tension spring for applying a resistant force against rotation of a swing frame 34, and the relationship between the bend and stretch movement of the link mechanisms 36 and the opening and closing operation of the opening portion 14 are reversed.

More specifically, in the gate valve 90 according to this embodiment, the sidewall of a casing 16 on a side reverse to a load lock chamber 12 side (the left side in FIGS. 9A to 9C) is provided with a guide 26 disposed thereon, which extends vertically downward. A base frame 28 is attached to the guide 26 to move vertically along the guide 26. The base frame 28 has a pair of arms 32 at the upper end, which extend horizontally toward a load lock chamber 12, and have distal ends pivotally supporting a swing frame 34.

A valve plug 24 is attached to the upper end of the swing frame 34. The swing frame 34 is connected to the base frame 28 near the lower end by a pair of link mechanisms 36. Each of the link mechanisms 36 can bend and stretch while flexing an intermediate portion. More specifically, each of the link mechanisms 36 includes first and second levers 42 and 44, which are pivotally connected to the base frame 28 and the swing frame 34, respectively. The first and second levers 42 and 44 are pivotally connected to each other by a mediation member 38.

The swing frame 34 is also connected to the base frame 28 by a compression spring 49 at the lower end. An air actuator 52 is fixed to a casing 16 between the base frame 28 and the swing frame 34. The air actuator 52 has a rod 54, which extends downward and vertically reciprocates in the space between the base frame 28 and the swing frame 34. The lower end of the rod 54 is connected to the mediation member 38 of the link mechanisms 36.

A pair of first stoppers 56 are disposed at the upper end of the guide 26, for defining the movement limit of the base frame 28 along the guide 26 on the valve seat 22 side. The movement limit of the mediation member 38 on the valve seat 22 side is defined by one end limit of the stroke of the reciprocation rod 54 of the air actuator 52.

In the gate valve 90, the swing frame 34 is provided with a counterclockwise biasing force by the compression spring 49 in FIGS. 9A to 9C. When the opening portion 14 is opened (see FIG. 9A), the rod 54 of the air actuator 52 is extended the most, and the link mechanism 36 stretches the most. Consequently, the swing frame 34 is not in a vertical state, but in a state where it has slightly rotated counterclockwise, and inclines in the casing 16. On the other hand, when the opening portion 14 is closed (see FIG. 9C), the rod 54 of the air actuator 52 is withdrawn the most, and the link mechanism 36 bends. Consequently, the swing frame 34 rotates clockwise against the biasing force of the compression spring 49, so that the valve plug 24 seats itself on the valve seat 22.

Although there are several differences other than the matters described above, the operation principle of the gate valve 90 is basically the same as that of the gate valve 20. Accordingly, also in the gate valve 90, the valve plug 24 is isolated from the driving section, and does not come into contact with any portion other than the valve seat 22. As a result, particles are prevented from being generated near the valve seat 22 and the valve plug 24, so that the interior of a load lock chamber 12 is unlikely to be contaminated with particles.

Note that the embodiments described above employ the air actuator 52 as a driving mechanism, but they may employ an alternative driving member, such as a hydraulically-operated cylinder. The embodiments described above employ a spring as a biasing member for applying a resistant force against rotation of the swing frame 34, but they may employ an alternative resilient member, such as rubber. Furthermore, the embodiments described above employ the valve seat 22 whose first seal surface 22a is vertical, but the present invention may be applied to a case where the first seal surface 22a inclines relative to a vertical plane. In this case, the distance between the axial point of the swing frame 34 and the valve plug 24, and the inclining amount of the seal surface 24a of the valve plug 24 are appropriately adjusted.

The present invention is not limited by the embodiments described above, but can be practiced in various embodiments without departing from the spirit and scope of the invention. The features of the embodiments described above can be arbitrarily combined with each other in practice, thereby obtaining combined effects.

What is claimed is:

1. A gate valve for a semiconductor processing system, comprising:

a base frame configured movable in a first direction to move toward and away from a valve seat, which surrounds an opening portion and has a first seal surface facing a first reference plane;

a first stopper configured to define a movement limit of the base frame on the valve seat side;

a swing frame attached to the base frame, and configured rotatable on a second reference plane perpendicular to the first reference plane;

a valve plug attached to the swing frame, and having a second seal surface to engage with the first seal surface thereby to close the opening portion;

a link mechanism connecting the swing frame to the base frame, and configured to bend and stretch while flexing an intermediate portion;

a driving mechanism connected to the intermediate portion, and configured to move the intermediate portion in the first direction; and a biasing member configured to apply a resistant force against rotation of the swing frame relative to the base frame, wherein, it is preset that, when the opening portion is closed, the intermediate portion is moved by the driving mechanism toward the valve seat to first cause the base frame to move until the base frame comes into contact with the first stopper, and then cause the link mechanism to bend or stretch thereby to rotate the swing frame, such that the valve plug seats itself on the valve seat, and the first and second seal surfaces engage with each other.

2. The valve according to claim 1, further comprising a guide fixed relative to the valve seat, wherein the base frame moves along the guide.

3. The valve according to claim 1, further comprising a damper disposed between the base frame and the swing frame to absorb an impact caused when the swing frame rotates relative to the base frame by an action of the biasing member.

4. The valve according to claim 1, wherein the driving mechanism comprises a reciprocation rod connected to the intermediate portion.

5. The valve according to claim 4, wherein the reciprocation rod penetrates a slit hole formed in the intermediate portion, and the reciprocation rod is movable relative to the intermediate portion in a range allowed by the slit hole.

6. The valve according to claim 4, wherein the reciprocation rod is connected to the intermediate portion by a position adjusting mechanism, such that a connecting position of the reciprocation rod relative to the intermediate portion is adjustable by the position adjusting mechanism.

7. The valve according to claim 4, wherein one end limit of a stroke of the reciprocation rod is set to correspond to a bend-and-stretch state of the link mechanism formed when the valve plug seats itself on the valve seat.

8. The valve according to claim 1, further comprising a second stopper configured to define a movement limit of the intermediate portion on the valve seat side to correspond to a bend-and-stretch state of the link mechanism formed when the valve plug seats itself on the valve seat.

9. The valve according to claim 8, wherein the second stopper is fixed to the base frame.

10. The valve according to claim 1, wherein the biasing member connects the swing frame to the base frame.

11. The valve according to claim 1, wherein the link mechanism comprises first and second levers connected to the base frame and the swing frame, respectively, to be pivotable on the second reference plane, and the intermediate portion connects the first and second levers to be pivotable to each other on the second reference plane.

12. The valve according to claim 1, wherein the first direction is substantially parallel to the first reference plane.

13. The valve according to claim 1, wherein the valve plug and the link mechanism are connected to the swing frame at first and second positions, respectively, sandwiching a position at which the swing frame is attached to the base frame.

14. The valve according to claim 1, wherein the opening portion is formed in a sidewall of an airtight chamber, in which a target substrate is accommodated, and the opening portion is formed to allow the target substrate to pass therethrough.

15. The valve according to claim 14, wherein the valve seat and the valve plug are arranged to isolate a vacuum atmosphere inside the airtight chamber from an atmospheric environment outside the airtight chamber.

16. A gate valve for a semiconductor processing system, comprising:

a base frame configured movable in a first direction to move toward and away from a valve seat, which surrounds an opening portion and has a first seal surface facing a first reference plane;

a first stopper configured to define a movement limit of the base frame on the valve seat side;

a swing frame attached to the base frame, and configured rotatable on a second reference plane perpendicular to the first reference plane;

a valve plug attached to the swing frame, and having a second seal surface to engage with the first seal surface thereby to close the opening portion;

a link mechanism connecting the swing frame to the base frame, and configured to bend and stretch while flexing an intermediate portion, the link mechanism comprising first and second levers connected to the base frame and the swing frame, respectively, to be pivotable on the second reference plane, the intermediate portion connecting the first and second levers to be pivotable to each other on the second reference plane;

a driving mechanism comprising a reciprocation rod connected to the intermediate portion, and configured to move the intermediate portion in the first direction; and a biasing member connecting the swing frame to the base frame, and configured to apply a resistant force against rotation of the swing frame relative to the base frame, wherein, it is preset that, when the opening portion is closed, the intermediate portion is moved by the driving mechanism toward the valve seat to first cause the base frame to move until the base frame comes into contact with the first stopper, and then cause the link mechanism to bend or stretch thereby to rotate the swing frame, such that the valve plug seats itself on the valve seat, and the first and second seal surfaces engage with each other.

* * * * *